United States Patent
Bacher (10) Patent No.: US 8,458,466 B2
(45) Date of Patent: Jun. 4, 2013

(54) SYSTEM AND METHOD FOR HANDLING CROSS-PLATFORM SYSTEM CALL IN A HYBRID SYSTEM

(75) Inventor: Utz Bacher, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 12/341,301

(22) Filed: Dec. 22, 2008

(65) Prior Publication Data

US 2010/0161978 A1  Jun. 24, 2010

(51) Int. Cl.
*H04L 29/06* (2006.01)
(52) U.S. Cl.
USPC .......................................... 713/166; 719/330
(58) Field of Classification Search
USPC ........................................................ 713/166
See application file for complete search history.

(56) References Cited

U.S. PATENT DOCUMENTS

| | | |
|---|---|---|
| 6,434,628 B1 | 8/2002 | Bowman-Amuah |
| 6,961,941 B1 | 11/2005 | Nelson et al. |
| 7,003,593 B2 | 2/2006 | Huppenthal et al. |
| 7,028,312 B1 * | 4/2006 | Merrick et al. ............... 719/330 |
| 7,200,840 B2 | 4/2007 | Gschwind et al. |
| 8,191,072 B2 | 5/2012 | Bacher |
| 2004/0172629 A1 | 9/2004 | Tene et al. |
| 2010/0161976 A1 | 6/2010 | Bacher |
| 2010/0162252 A1 | 6/2010 | Bacher |

OTHER PUBLICATIONS

Karimi, K.; Sharifi, M.; "Transparent Distributed Programming under Linux," High-Performance Computing in an Advanced Collaborative Environment, 2006. HPCS 2006. 20th International Symposium on , vol., No., pp. 13, May 14-17, 2006.*
Zhou, S.; Stumm, M.; Li, K.; Wortman, D.; , "Heterogeneous distributed shared memory," Parallel and Distributed Systems, IEEE Transactions on , vol. 3, No. 5, pp. 540-554, Sep. 1992.*
Ousterhout, J.K.; Cherenson, A.R.; Douglis, F.; Nelson, M.N.; Welch, B.B.; , "The Sprite network operating system," Computer , vol. 21, No. 2, pp. 23-36, Feb. 1988.*
x86 Linux Application Consolidation on Power Systems Platforms Using IBM Virtualization Technologies. IBM Corporation 2008. Whitepaper dated Jan. 29, 2008. 10 pages.

(Continued)

*Primary Examiner* — Carl Colin
*Assistant Examiner* — Syed Zaidi
(74) *Attorney, Agent, or Firm* — Schmeiser, Olsen & Watts, LLP; Thomas Tyson (57) ABSTRACT

A system and associated method for handling a system call in a hybrid system. The hybrid system comprises a first computer system and a second computer system coupled to the first computer system at a respective kernel of the respective computer system. A user application of the first computer system requests a kernel service by invoking a system call to a first kernel. The first kernel determines that the system call is remotely executed by a second kernel of the second computer system. The system call and associated parameters are converted to be executable in the second computer system and transferred to the second computer system. The second computer system executes the system call and a result is returned to the first computer system. The result is reversely converted for the first computer system and the user application receives the result.

17 Claims, 4 Drawing Sheets

OTHER PUBLICATIONS

U.S. Appl. No. 12/341,342, filed Dec. 22, 2008, Customer No. 82116.

U.S. Appl. No. 12/342,704, filed Dec. 23, 2008; Customer No. 82116.

Amendment filed Apr. 11, 2012 in response to Office Action (Mail Date Dec. 27, 2011) for U.S. Appl. No. 12/342,704, filed Dec. 23, 2008.

Final Office Action (Mail Date Jun. 20, 2012) for U.S. Appl. No. 12/342,704, filed Dec. 23, 2008.

Duzett, et al.; An overview of the NCUBE3 Supercomputer; Fourth Symposium on the Frontiers of Massively Parallel Computation; Oct. 19-21, 1992; pp. 458-464.

Rashid, et al.; Accent: A communication oriented network operating system kernel; SIGOPS Oper. Syst. Rev. 15, 5 (Dec. 1981); pp. 64-75.

Zhou et al.; Heterogeneous distributed shared memory, Parallel and Distributed Systems, IEEE Transactions on, vol. 3, No. 5, pp. 540-554, Sep. 1992.

Office Action (Mail Date Dec. 27, 2011) for U.S. Appl. No. 12/342,704, filed Dec. 23, 2008.

Final Office Action (Mail Date Jan. 20, 2012) for U.S. Appl. No. 12/341,391, filed Dec. 22, 2008.

* cited by examiner

SYSTEM AND METHOD FOR HANDLING CROSS-PLATFORM SYSTEM CALL IN A HYBRID SYSTEM

FIELD OF THE INVENTION

The present invention discloses a system and associated method for efficiently combining high-end mainframe systems and lower-end server systems to provide stable and cost-effective computing environments.

BACKGROUND OF THE INVENTION

Mission-critical applications require stable and efficient computing environment. High-end mainframes are employed to stably host mission-critical applications. However, the high-end mainframes are prohibitively expensive to perform computation-intensive applications. Consequently, lower-end servers that primarily execute computation-intensive applications are often combined with high-end mainframes to provide both stability and computing performance at a reasonable cost. However, issues regarding system integration, application migration, system management and administration must be solved to interconnect two types of platforms.

Thus, there is a need for a system and associated method that efficiently interconnect high-end mainframes and lower-end servers.

SUMMARY OF THE INVENTION

The present invention provides a method for handling a system call in a hybrid system, the method comprising:

receiving a request to execute the system call from a user application running on a first computer system, wherein the system call provides a kernel service upon being executed, wherein the hybrid system comprises the first computer system and a second computer system, the first computer system comprising the user application and a first kernel, the second computer system comprising a second kernel, and wherein the first kernel is coupled to the second kernel;

discovering that the system call is predetermined to be remotely executed on the second computer system of the hybrid system;

converting the system call into a second configuration that is compatible with the second computer system such that the second kernel executes the converted system call to provide the kernel service to the user application;

transferring the converted system call to the second kernel;

obtaining a result of executing the converted system call, wherein the result is produced by the second kernel;

adjusting the obtained result to generate an adjusted result such that the adjusted result is in a first configuration that is compatible with the first computer system; and sending the adjusted result to the user application that had sent the request, wherein said receiving, said discovering, said converting, said transferring, said obtaining, said adjusting, and said sending are performed by the first kernel.

The present invention provides a computer program product, comprising a computer usable storage medium having a computer readable program code embodied therein, said computer readable program code containing instructions that when executed by a processor of a computer system implement a method for handling a system call in a hybrid system, the method comprising:

receiving a request to execute the system call from a user application running on a first computer system, wherein the system call provides a kernel service upon being executed, wherein the hybrid system comprises the first computer system and a second computer system, the first computer system comprising the user application and a first kernel, the second computer system comprising a second kernel, and wherein the first kernel is coupled to the second kernel;

discovering that the system call is predetermined to be remotely executed on the second computer system of the hybrid system;

converting the system call into a second configuration that is compatible with the second computer system such that the second kernel executes the converted system call to provide the kernel service to the user application;

transferring the converted system call to the second kernel;

obtaining a result of executing the converted system call, wherein the result is produced by the second kernel;

adjusting the obtained result to generate an adjusted result such that the adjusted result is in a first configuration that is compatible with the first computer system; and sending the adjusted result to the user application that had sent the request, wherein said receiving, said discovering, said converting, said transferring, said obtaining, said adjusting, and said sending are performed by the first kernel.

The present invention provides a system comprising a processor and a computer readable memory unit coupled to the processor, said memory unit containing instructions that when executed by the processor implement a method for handling a system call in a hybrid system, the method comprising:

receiving a request to execute the system call from a user application running on a first computer system, wherein the system call provides a kernel service upon being executed, wherein the hybrid system comprises the first computer system and a second computer system, the first computer system comprising the user application and a first kernel, the second computer system comprising a second kernel, and wherein the first kernel is coupled to the second kernel;

discovering that the system call is predetermined to be remotely executed on the second computer system of the hybrid system;

converting the system call into a second configuration that is compatible with the second computer system such that the second kernel executes the converted system call to provide the kernel service to the user application;

transferring the converted system call to the second kernel;

obtaining a result of executing the converted system call, wherein the result is produced by the second kernel;

adjusting the obtained result to generate an adjusted result such that the adjusted result is in a first configuration that is compatible with the first computer system; and sending the adjusted result to the user application that had sent the request, wherein said receiving, said discovering, said converting, said transferring, said obtaining, said adjusting, and said sending are performed by the first kernel.

The present invention provides a method and system that overcomes at least one of the current disadvantages of conventional method and system for providing kernel services in a hybrid system.

DETAILED DESCRIPTION OF THE INVENTION

Figure 1:
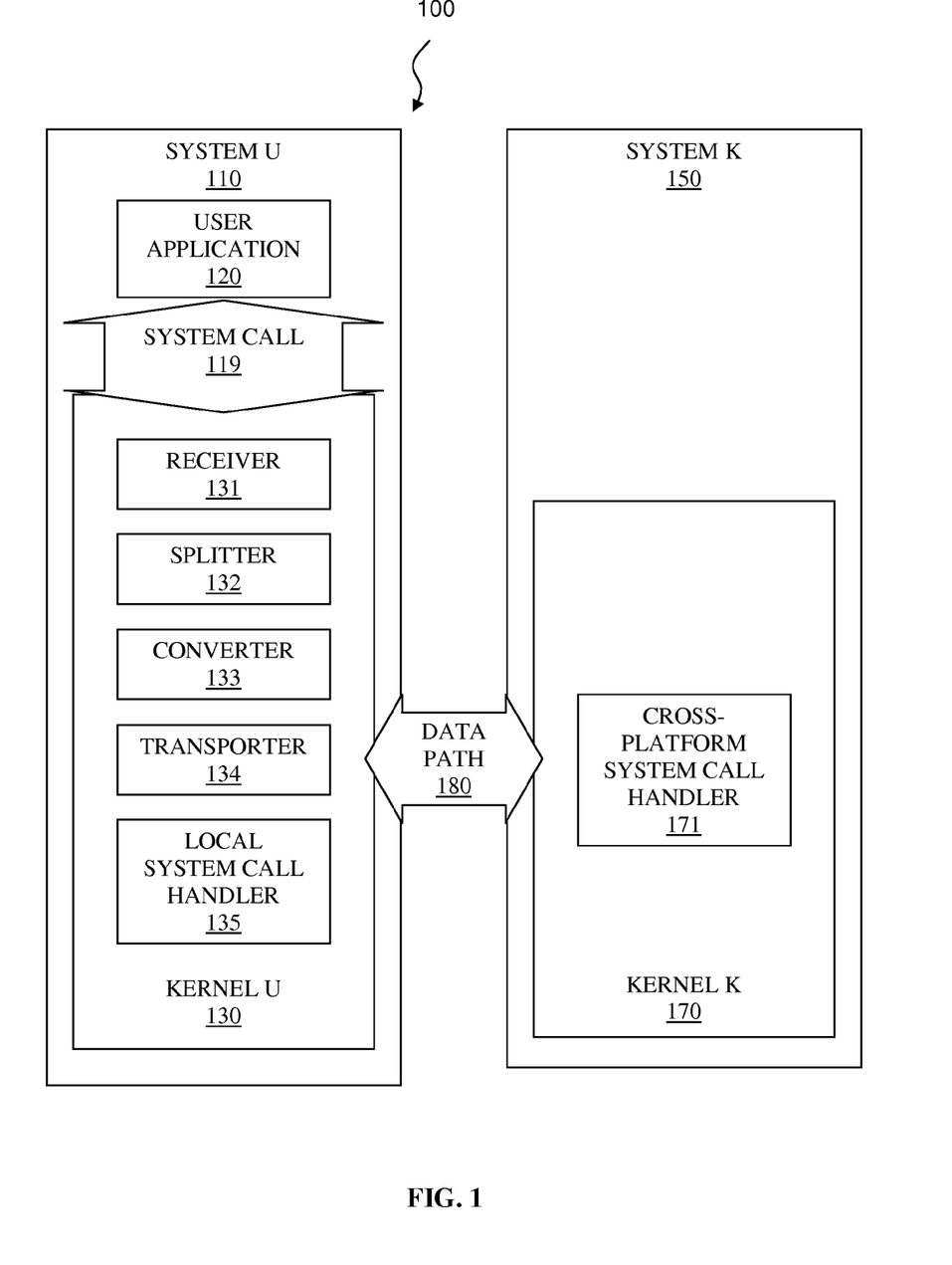
FIG. 1 illustrates a hybrid system that integrates two architecturally different systems respectively comprising kernels U and K at kernel levels, in accordance with embodiments of the present invention.

FIG. 1 illustrates a hybrid system 100 that integrates two architecturally different systems respectively comprising kernels U and K at kernel levels, in accordance with embodiments of the present invention.

The hybrid system 100 comprises at least one system U and a system K 150 interconnected through a data path 180. A system U 110 of said at least one system U is a lower-end server that is configured to primarily execute user applications that have intensive computation workloads in the hybrid system 100. The system K 150 is a high-end mainframe that is configured to primarily execute kernel services for the hybrid system 100. The system U 150 and the system K 150 operate on respective hardware platforms and have respective software environments that have convertible system calls for respective kernels. The system U 150 and the system K 150 communicate with each other through the data path 180 that interconnects their respective kernels. The hybrid system 100 is configured to be perceived by users as a single system that provides functionalities and characteristics of both the system U 110 and the system K 150.

The system U 110 is the lower-end server that is configured to primarily execute user applications for both the system U 110 and the system K 150 in the hybrid system 100. The system U 110 comprises at least one user application U and a kernel U 130.

A user application 120 of said at least one user application U is a user mode executable code of the system U 110. When the user application 120 needs a kernel service, the user application 120 invokes a system call U 119 to interfaces with the kernel U 110. The system call U 119 requests a service provided by the kernel U 130 and/or by the kernel K 170.

The kernel U 130 is a main part of an operating system that controls the system U 110. The operating system provides services such as, inter alia, time/clock related services, memory management services, process management services including scheduling, termination, and signalling, data services such as file/file system operations, network operations, and I/O calls, debugging and logging functionalities, inter-process communication (IPC) services without a shared memory, memory sharing services, I/O synchronizations, system administration services, and hardware services, etc. Examples of the operating system may be, inter alia, Linux, UNIX®, etc. (UNIX is a registered trademark of X/Open Company Ltd., in the United States and other countries.)

The kernel U 130, among other operating system functionalities, specifically refers to a system call handling facility of the system U 110 throughout this specification. The kernel U 130 comprises a receiver 131, a splitter 132, a converter 133, a transporter 134, and a local system call handler 135, which are functional components rather than physically separated units.

The receiver 131 is an interface between a system call 119 invoked from the user application 120 and the kernel U 130.

The system call 119 is serviced by the system U 110 and/or the system K 150. The receiver 131 sends the received system call 119 to the splitter 132.

The splitter 132 determines whether the received system call 119 is either a local system call of the system U 110 or a remote system call of the system K 150. The splitter 132 forwards the local system call to the local system call handler 135 and the remote system call to the converter 133.

In one embodiment of the present invention, examples of local system calls are, inter alia, a clock request system call of the user application 120 that does not need to be synchronized with the system K 150, a memory management system call such as mprotect ( ) that modifies swapping properties of the user application, etc.

In the same embodiment of the present invention, examples of remote system calls are, inter alia, time related services, process/signal management services, file/file system operations, network operations, I/O devices accesses, debugging and logging functionalities, inter-process communication (IPC) services without a shared memory, a shared memory, etc.

The converter 133 converts the received remote system call to a corresponding system K system call that is executable on the system K 150. The converter 133 also converts a result of executing the corresponding system K system call returned from the system K 150 to a corresponding result for the system U 110 to provide the corresponding result to the user application 120.

System calls of the system U 110 and system calls of the system K 150 are previously mapped according to their respective functionalities. Examples of issues to be addressed by the converter 133 may be, inter alia, a possible difference in endianness between the system U 110 and the system K 150, memory mappings, etc.

The transporter 134 sends the converted corresponding system K system call from the system U 110 to the system K 150. After the system call is executed on the system K 150, the transporter 134 receives a result of the converted corresponding system K system call from the system K 150.

The local system call handler 135 executes the local system call received from the splitter 132 and returns a result to the user application 120 that had invoked the system call.

The system K 150 is, as noted, the high-end mainframe that is configured to primarily execute kernel services for both the system U 110 and the system K 150 in the hybrid system 100. The system K 150 comprises at least one user application K and a kernel K 170.

The kernel K 170 is a core of an operating system that controls the system K 150. 110. See description of the kernel U 130, supra, for services provided by the operating system. The kernel K 170 comprises a system call handler K 171.

The system call handler K 171 receives a system call request from the transporter 134 of the system U 110 through the data path 180. The received system call request is serviced by the system call handler K 171. After executing the system call request, the system call handler K 171 returns a result to the transporter of the system U 110 through the data path 180. The system call handler K 171 controls an I/O device driver that handles an input/output (I/O) request that is directed to an I/O device that is controlled by the system K 150. In the hybrid system 100, the kernel K 170 services all I/O requests from both the system U 110 and the system K 150. Examples of the I/O device may be, inter alia, HiperSockets®, a direct access storage device (DASD), enterprise tape systems, etc. (HiperSockets is a registered trademark of International Business Machines Corporation in the United States and other countries.)

The data path 180 interconnects the transporter 134 of the kernel U 130 and the system call handler 171 of the kernel K 170. The data path 180 directly connects the system U 110 and the system K 150 in a kernel level with a high-speed communication I/O device such as 10 Gigabit Ethernet.

In one embodiment of the present invention, the system U 110 is a blade server employing Intel® or AMD® processors and the system K 150 is an IBM® System z® mainframe. (Intel is a registered trademark of Intel Corporation in the United States and other countries; AMD is a registered trademark of Advanced Micro Devices, Inc in the United States and other countries; IBM and System z are registered trademarks of International Business Machines Corporation in the United States and other countries.) Both the blade server and the mainframe employ the Linux operating system or other UNIX family OS. The hybrid system 100 maintains input/output capability of the mainframe to HiperSockets, a direct access storage device (DASD), enterprise tape systems, etc. The hybrid system 100 retains superior hardware stability and management features of the mainframe. The hybrid system 100 also executes computation intensive applications on the blade server to achieve cost effectiveness. The hybrid system 100 provides a unified view of all resources for all applications on both the mainframe and the blade server.

The hybrid system 100 may be employed in areas of, inter alia, dynamic web servicing, data mining, SAP® R/3 application serving, Domino® groupware processing, application servicing and Java® processing. (SAP is a registered trademark of SAP AG in the United States and other countries; Domino is a registered trademark of International Business Machines Corporation in the United States and other countries; Java is a registered trademark of Sun Microsystems, Inc., in the United States and other countries.)

Figure 2A:
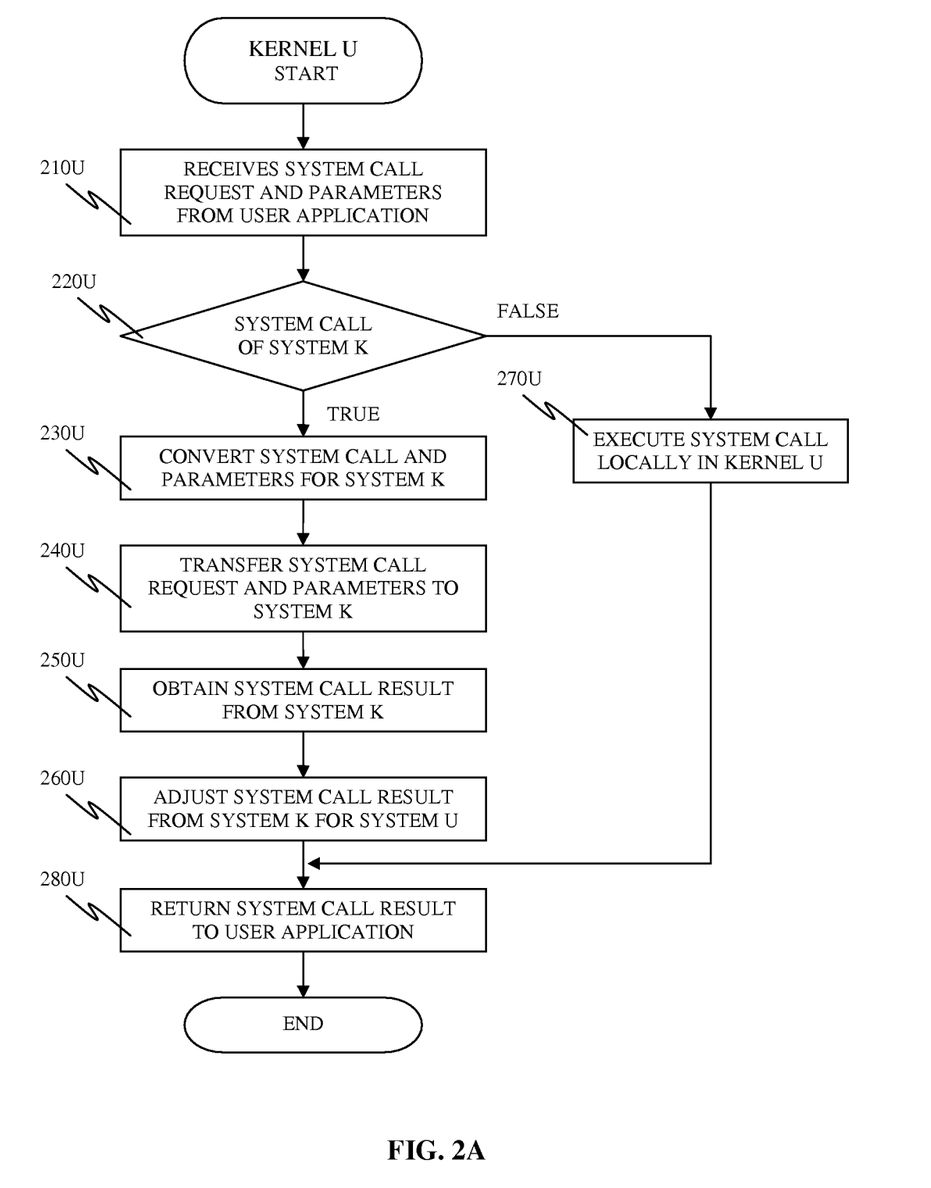
FIG. 2A is a flowchart depicting a method for handling a system call by the kernel U in the hybrid system of FIG. 1, in accordance with the embodiments of the present invention.

FIG. 2A is a flowchart depicting a method for handling a system call by the kernel U in the hybrid system of FIG. 1, supra, in accordance with the embodiments of the present invention.

Initially, the user application runs in a user mode on the system U. To perform a kernel operation, the user application invokes a system call to interface with the kernel U of the system U. Upon invoking the system call, the user application passes control over to the kernel U, and the system U starts running in a kernel mode to handle the system call.

In step 210U, the kernel U receives the system call request and parameters of the system call. The receiver of FIG. 1, supra, represents step 210U, which may be a separate sub-procedure. The kernel U proceeds with step 220U.

In step 220U, the kernel U determines whether the system call should be executed remotely on the system K or whether the system call can be executed locally on the system U. If the kernel U determines that the system call can be executed remotely on the system K, then the system call handler of the kernel U proceeds with step 230U. If the kernel U determines that the system call can be executed locally on the system U, then the kernel U proceeds with step 270U.

In one embodiment of the present invention, the kernel U uses a predefined number scheme for each system call in determining whether the system call is remote or local in step 220U. Each system call and required parameters for each system call are analyzed and assigned a respective number describing a function of the system call. Examples of system call numbering based on the function of each system call may be, inter alia, {1=write, 2=read, 3=fork, 4=get-time-of-day, . . . }, etc. Based on the assigned number and necessary parameters of the system call, the kernel U determines whether to execute the system call either locally or remotely.

For more effective and seamless integration of the system U and the system K, this embodiment locally executes memory management services and remotely executes time-related services, process/signal management services, scheduling services, file and file system operations, network operations, I/O calls, debugging and logging functionalities, inter-process communication (IPC) services without shared memory, and shared memory operations, etc.

There are certain system calls that require special/combined actions rather than simple remote/local execution. These actions are implementation specific and usually simulate the system call in a manner that provides services of the system call and satisfies system-specific requirements of both the kernel U and the kernel K. Examples of system calls require special actions may be, inter alia, I/O synchronizing system calls, exit ( ) system call, administrative system calls, and hardware-specific system calls, etc. In cases of I/O synchronizing system calls such as sync ( ), close ( ), if there is no optimization of a shared page cache, these I/O synchronizing system calls will trigger synchronization of local dirty buffers of the system U to a disk through the system K, before the actual system call is performed remotely. Examples of administrative system calls are, inter alia, reboot ( ), kernel module handling calls, virtualization system calls, etc.

In another embodiment, step 220U determines that time-related system calls are locally executable on the system U. In this embodiment, only applications executed on the system U see the same time, or time services on the system U and the system K must be synchronized using existing technologies such as the Network Time Protocol (NTP) as specified in Request For Comments (RFC) 1305 by the Internet Engineering Task Force (IETF).

In another embodiment, step 220U determines that file/file system, network and I/O calls as locally executable for all and/or part of resources to optimize performance of the hybrid system. To support such optimization, the view on all or some I/O resources that is locally serviced on the system U should be identical both on the system U and on the system K. In this embodiment, by using shared file systems and disks, the present invention performs inter-process communication (IPC) calls and/or shared memory locally on the system U. An example of shared file systems and disk devices may be, inter alia, the Global File System (GFS) on a shared Storage Area Network (SAN) device. Although this embodiment significantly increases performance for inter-process communication (IPC) and/or shared memory service calls, the inter-process communication (IPC) domain is restricted to the system U, rendering the hybrid system not completely transparent between the system U and the system K. However, in cases when all parts of an application doing inter-process communication (IPC) or using shared memory are executed on the system U, the performance gain can compensate the loss of transparency between the system U and the system K. These inter-process communication (IPC)/shared memory resources cannot be seen on the system K or other nodes.

In still another embodiment, step 220U determines that limited number of process management calls should be locally executed. While remotely executing most of process management calls on the system K, this embodiment locally services, inter alia, the system call getpid ( ) that requests an identifier (ID) of a process that is being used, because the system U locally has all the information available to service the getpid ( ) system call and such local service of frequent process management system calls will optimize performance of the hybrid system.

In aforementioned embodiments, a notification can be sent to the system K from the system U to make the hybrid system transparent between the system U and the system K. Such notification can be used for system logs and/or debugging purposes. Also, aforementioned embodiments in determining whether a system call is local or remote can be used in combination with embodiments for other system calls in implementing the system U and/or the system K.

In step 230U, the kernel U converts the system call and parameters associated with the system call into a corresponding system K system call and associated parameters for the converted corresponding system K system call, respectively.

System calls and parameters are inherent to a platform and a kernel on which system calls are executed. Thus, to provide a consistent result in cross-platform system call execution, the kernel U system call and the parameters must be converted to the kernel K system call and corresponding system K data before an execution. System calls in respective systems are mapped by number and/or function. The parameters are converted with respect to differences between the systems, inter alia, endianness, address space usage, pointers, namespace of object identifiers, memory object synchronization, etc.

Numeric parameters such as like integer values or bitmasks are converted to compensate for differences in internal representation of numbers called endianness. For example, if the system U is a little endian system and the system K is a big endian system, the numeric parameters of the system U system call will be reversed to match the endianness of the system K.

An example of a system call with numeric parameters may be, inter alia, kill ( ), etc. The kill ( ) system call has two integer parameters representing a process ID and a signal number to be sent to a process identified by the process ID. The system call number will be converted to match the kill ( ) system call number on the system K. If the system U and the system K have different endianness, the process ID and the signal number are endian-converted.

When a parameter of the system call is a memory reference or a memory object, converting the parameter needs extra steps. When a pointer parameter refers to memory areas having raw data, the kernel U copies the referenced data to system K and converts the pointer parameter such that the converted pointer parameter can be associated with the copied raw data in the system K. Example of the raw data may be, inter alia, content of I/O operations, etc. Because the user space on the system U can refer to different pages from the kernel space for the system K, synchronizing system calls like sync ( ) and/or close ( ) require the kernel U to write dirty pages to the file before executing the sync ( ) and/or close ( ) system calls remotely on the system K. An example of a case when the user space on the system U refers to different pages from the kernel space for the system K may be, inter alia, when an application performs a memory map system call mmaps ( ) upon a file into an address space of the system U.

An example of a system call with memory reference may be, inter alia, write ( ) A write ( ) system call has three parameters representing a file descriptor that is an integer, a buffer area that is a pointer to a starting address of a memory area to write, and a length of the buffer area that is an integer representing the size of the buffer area to write. The system call number of the write ( ) system call is converted to match the write ( ) system call number on the system K. If the system U and the system K have different endianness, the file descriptor and the length of the buffer area are endian-converted. Data in the buffer area will be copied to the system K and the buffer area parameter is adjusted to point to the copied memory area in the system K.

For a system call having memory reference parameters, a memory area referred to by a parameter of the system call may be a structured object rather than raw data. For example, the ioctl ( ) system call may have an object supporting a buffer interface. The structured object referred to by the parameter should be evaluated and converted element by element in the structured object pursuant to the usage of the parameter in the system call to execute the system call remotely on the system K. Each element in the structured object may be a numeric parameter, a memory reference with raw data, or a memory reference with a structured object. Each element in the structured object is converted as described in step 230U.

Figure 2B:
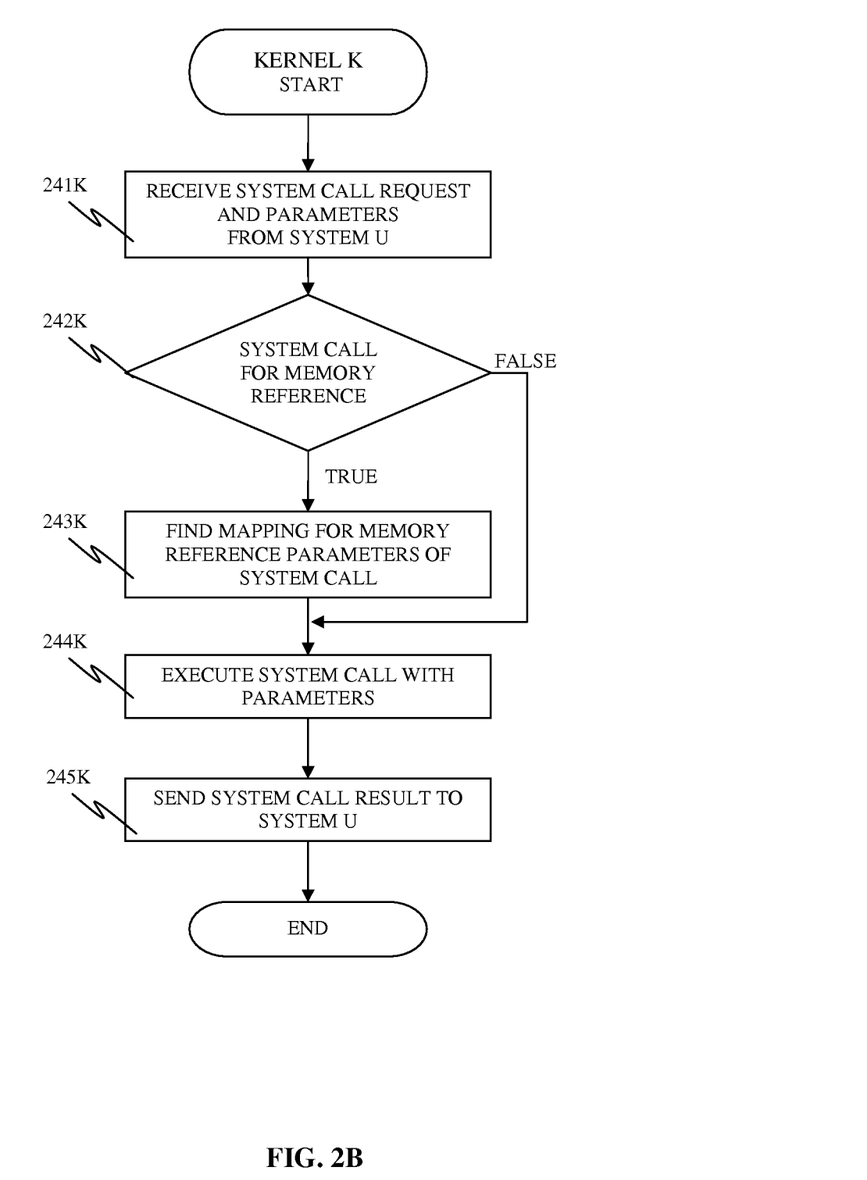
FIG. 2B is a flowchart depicting a method for handling a system call by the kernel K in the hybrid system of FIG. 1, in accordance with the embodiments of the present invention.

In step 240U, the kernel U transfers the system call request including all parameters and data to the system K through the data path, which are received by the kernel K in step 241K of FIG. 2B, infra. The kernel U proceeds with step 250U.

In step 250U, the kernel U receives results from the kernel K performing step 245K of FIG. 2B, infra. The kernel U proceeds with step 260U.

In step 260U, the kernel U adjusts the result received in step 250U from the system K for the system U kernel and application. The adjustment in step 260U is a reverse process of the conversion in step 230U. Thus the adjustment in step 260U also comprises reverse conversions of data due to little/big endian differences, reverse conversions of data, pointers, raw data, and/or structured data to be configured for the system U, reverse translations of namespaces from the system K to the system U, etc. Because the result received in step 250U is executed on the system K, the result should be configured for the system U before the result is returned to the user application.

If the system call has an impact on structures of the kernel U, the kernel U structure is updated in step 260U as a part of the adjustment. For example, if the system call is for signal or process management, a result of executing the system call changes processing environments of the system U in the kernel space and/or the user space. The kernel U proceeds with step 280U.

In step 270, the kernel U executes the system call locally on the system U as in a conventional single platform system consisting of the system U. The kernel U proceeds with step 280U.

In step 280, the kernel U returns the adjusted result from either step 260U or step 270U to the user application that had invoked the system call U. If any status updates resulting from executing the system call remotely on the system K need to be made available to the system U, the kernel U transmits such information regarding status updates to the system U prior to returning the control to the user application such that the user application on the system U obtains the result of the system service produced by executing the system call. The user application takes control of the thread of execution back from the kernel U and resumes the execution.

FIG. 2B is a flowchart depicting a method for handling a system call by the kernel K in the hybrid system of FIG. 1, supra, in accordance with the embodiments of the present invention.

In step 241K, the kernel K receives a system call request and parameters from the kernel U performing step 240U of FIG. 2A, supra.

In step 242K, the kernel K determines whether the requested system call needs memory reference to execute the requested system call. If the requested system call has parameters referring to a memory space, the kernel U marks the system call for a memory reference during the conversion in step 230U of FIG. 2A, supra. Thus the kernel K determines that the requested system call needs a memory reference pursuant to the information received from the kernel U. If the kernel K determines that the requested system call needs a memory reference, the kernel K proceeds with step 243K. If the kernel K determines that the requested system call does not need a memory reference, the kernel K proceeds with step 244K.

In step 243K, the kernel K finds a mapping associated with each memory reference parameter of the requested system call. The mappings associated with each memory pointer parameter is consistent with a result of converting memory reference parameters from the system U to system K, which was performed in step 230U of FIG. 2A, supra. The kernel K uses the mapping associated with each memory reference parameter to locate parameters of the requested system call on the system K. After this step, memory references point to data areas on system K, which have been referenced by the system call on system U and have been copied from the according data areas of system U in step 240U. The kernel K proceeds to step 244K.

In this embodiment, by converting memory reference parameters on the system U, the hybrid system shifts as much computation and/or workload as possible from the system K to the system U associated with executing a cross-platform system call.

In another embodiment of the present invention, the conversion of memory reference parameters in step 230U on the system U and the mapping in step 243K on the system K may be integrated into a conversion of memory reference parameters on the system K, after the kernel K received the requested system call and related parameters. In this embodiment, the hybrid system imposes more workload on the system K to execute a cross-platform system call to achieve a simpler implementation.

In step 244K, the kernel K executes the requested system call with parameters that are configured for the kernel K.

In step 245K, the kernel K sends a result from executing the requested system call to the kernel U.

Figure 3:
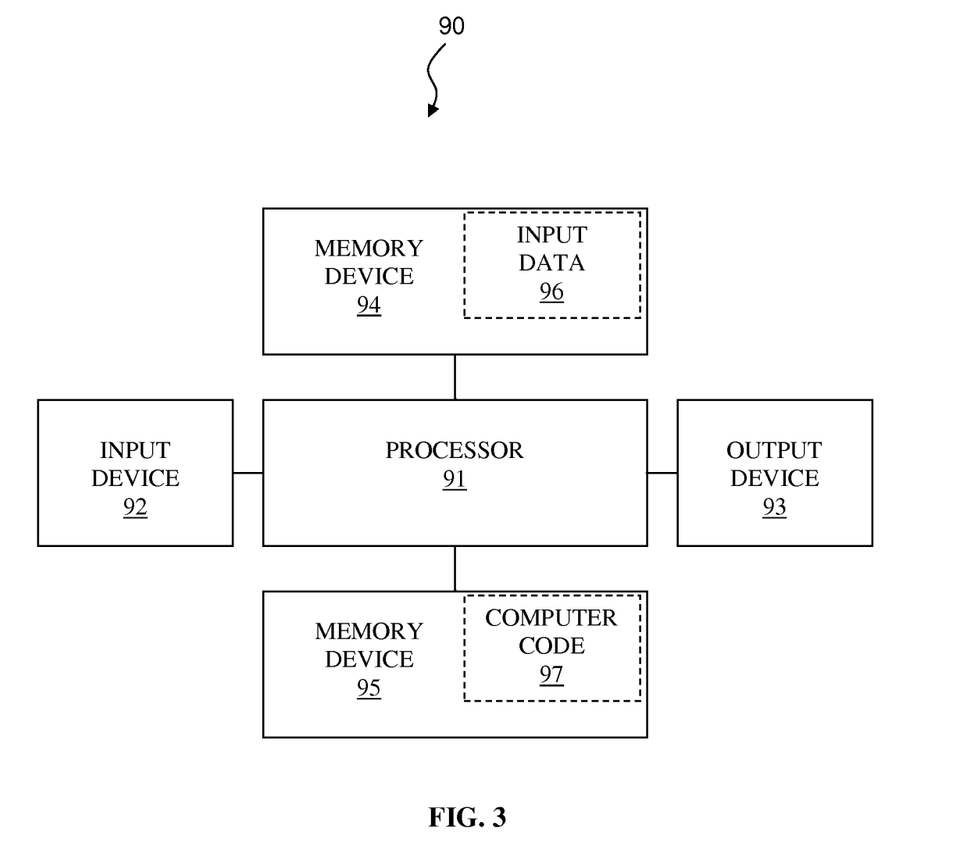
FIG. 3 illustrates a computer system used for handling a cross-platform system call in the hybrid system, in accordance with embodiments of the present invention.

FIG. 3 illustrates a computer system 90 used for handling a cross-platform system call in the hybrid system, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for handling a cross-platform system call in the hybrid system according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for handling a system call in a hybrid system, wherein the hybrid system comprises a first computer and a plurality of remote computers, wherein the plurality of remote computers comprises a second computer, wherein the architecture of the first computer differs from the architecture of the second computer, wherein the operating system of the first computer differs from the operating system of the second computer, wherein the first computer is running a first kernel and a user application, wherein the second computer is running a second kernel, and wherein the first kernel is coupled to the second kernel by a kernel-to-kernel data path such that the user application perceives the hybrid system as a single computer system, the method comprising:

the first computer receiving a request from the user application to execute the system call, wherein the system call requests a service required by the user application;

the first computer forwarding the request to the first kernel;

the first kernel associating the system call with a single-digit numeric category, wherein the single-digit numeric category is selected as a function of the type of service requested by the system call;

the first kernel determining that the system call will be serviced by the second computer, wherein the determining is a function of the numeric category, wherein the determining is a further function of an identification by the first kernel that the requested service is not related to memory management, and wherein the determining is a further function of an identification the first kernel that the second computer can service the first request more efficiently than can an other computer comprised by the hybrid system;

the first kernel converting the system call into a second configuration that is compatible with the second computer such that the second computer is able to service the system call, wherein the second configuration is a function of second characteristics of the second computer, wherein the second characteristics are selected from the group comprising endianness, address space usage, pointer usage, namespace for object identifiers, and memory object synchronization rules;

the first kernel transferring the converted system call to the second kernel via the kernel-to-kernel data path;

the first kernel obtaining, from the second kernel via the kernel-to-kernel data path, a result of servicing the converted system call, wherein the result is produced by the second kernel;

the first kernel adjusting the obtained result into a first configuration, wherein the adjusted result is compatible with the user application, wherein the adjusted result appears to the user application to have been performed by the first computer, wherein the first configuration is a function of first characteristics of the first computer, and wherein the first characteristics are selected from the group comprising endianness, address space usage, pointer usage, namespace for object identifiers, and memory object synchronization rules; and the first kernel providing to the user application the service requested by the system call by sending the adjusted result to the user application.

2. The method of claim 1, said discovering comprising:

finding that the system call is comprised by a set of at least one non-local system calls of the first computer that is executable on the second computer, wherein said at least one non-local system calls is not required to be locally executed by the first kernel, wherein said at least one non-local system calls is selected from the group comprising: time service system calls, process management system calls, signal management system calls, scheduling system calls, file management system calls, file system management system calls, network system calls, input/output (I/O) system calls, interprocess communication (IPC) system calls, debugging system calls, logging system calls, and shared memory management system calls, and wherein each non-local system call of said at least one non-local system calls of the first computer corresponds to a respective system call of the second computer such that said each non-local system calls of the first computer and the respective system call of the second computer provide a same kernel service upon being executed.

3. The method of claim 1, said converting comprising:

the first kernel finding a mapped system call in the second configuration that corresponds to the system call of the first computer, wherein the system call of the first computer is in the first configuration that is executable in the first computer and the mapped system call is in the second configuration that is executable in the second computer, and wherein the mapped system call provides a service equivalent to the service provided by the system call of the first computer; and the first kernel transforming parameters of the system call of the first computer into corresponding parameters in the second configuration for the mapped system call such that the second computer executes the mapped system call on behalf of the first computer by use of the corresponding parameters in the second configuration to provide the requested service to the user application running on the first kernel.

4. The method of claim 1, the method further comprising:

the second kernel receiving the converted system call from the first kernel;

the second kernel determining that the received converted system call has no parameter that refers to a first memory space in the first computer;

the second kernel executing the received converted system call on the second computer by use of parameters received from the first kernel; and the second kernel sending the result of said executing to the first computer system, wherein, said receiving of the converted system call, said determining, said executing, and said sending of the result are performed by the second kernel after the transferring and before the obtaining.

5. The method of claim 1, the method further comprising:

the second kernel receiving the converted system call from the first kernel;

the second kernel determining that at least one parameter necessary to execute the received converted system call is a memory reference parameter that refers to a first memory space in the first computer;

the second kernel finding a corresponding memory parameter that corresponds to the memory reference parameter, wherein the corresponding memory parameter refers to a second memory space in the second computer;

the second kernel executing the received converted system call on the second computer, wherein said executing comprises a function of the corresponding memory parameter; and the second kernel sending the result from said executing to the first computer, wherein, said receiving of the converted system call, said determining, said finding, said executing, and said sending of the result are performed by the second kernel after the transferring and before the obtaining.

6. The method of claim 1, wherein the first computer is a lower-end server that is configured to primarily execute the user application within the hybrid system, wherein execution of the user application creates a computation-intensive workload, and wherein the second computer is a higher-end mainframe that is configured to provide kernel services for the hybrid system.

7. A computer program product, comprising a computer usable storage device having a computer readable program code embodied therein, said computer readable program code containing instructions that when executed by a processor of a computer system implement a method for handling a system call in a hybrid system, wherein the hybrid system comprises a first computer and a plurality of remote computers, wherein the plurality of remote computers comprises a second computer, wherein the architecture of the first computer differs from the architecture of the second computer, wherein the operating system of the first computer differs from the operating system of the second computer, wherein the first computer is running a first kernel and a user application, wherein the second computer is running a second kernel, and wherein the first kernel is coupled to the second kernel by a kernel-to-kernel data path such that the user application perceives the hybrid system as a single computer system, the method comprising:

the first computer receiving a request from the user application to execute the system call, wherein the system call requests a service required by the user application;

the first computer forwarding the request to the first kernel;

the first kernel associating the system call with a single-digit numeric category, wherein the single-digit numeric category is selected as a function of the type of service requested by the system call;

the first kernel determining that the system call will be serviced by the second computer, wherein the determining is a function of the numeric category, wherein the determining is further function of an identification by the first kernel that the requested service is not related to memory management, and wherein the determining is a further function of an identification by the first kernel that the second computer can service the first request more efficiently than can an other computer comprised by the hybrid system;

the first kernel converting the system call into a second configuration that is compatible with the second computer such that the second computer is able to service the system call, wherein the second configuration is a function of second characteristics of the second computer, wherein the second characteristics are selected from the group comprising endianness, address space usage, pointer usage, namespace for object identifiers, and memory object synchronization rules;

the first kernel transferring the converted system call to the second kernel via the kernel-to-kernel data path;

the first kernel obtaining, from the second kernel via the kernel-to-kernel data path, a result of servicing the converted system call, wherein the result is produced by the second kernel;

the first kernel adjusting the obtained result into a first configuration, wherein the adjusted result is compatible with the user application, wherein the adjusted result appears to the user application to have been performed by the first computer, wherein the first configuration is a function of first characteristics of the first computer, and wherein the first characteristics are selected from the group comprising endianness, address space usage, pointer usage, namespace for object identifiers, and memory object synchronization rules; and the first kernel providing to the user application the service requested by the system call by sending the adjusted result to the user application.

8. The computer program product of claim 7, said discovering comprising:

finding that the system call is comprised by a set of at least one non-local system calls of the first computer that is executable on the second computer, wherein said at least one non-local system calls is not required to be locally executed by the first kernel, wherein said at least one non-local system calls is selected from the group comprising: time service system calls, process management system calls, signal management system calls, scheduling system calls, file management system calls, file system management system calls, network system calls, input/output (I/O) system calls, inter-process communication (IPC) system calls, debugging system calls, logging system calls, and shared memory management system calls, and wherein each non-local system call of said at least one non-local system calls of the first computer corresponds to a respective system call of the second computer such that said each non-local system calls of the first computer and the respective system call of the second computer provide a same kernel service upon being executed.

9. The computer program product of claim 7, said converting comprising:

the first kernel finding a mapped system call in the second configuration that corresponds to the system call of the first computer, wherein the system call of the first computer is in the first configuration that is executable in the first computer and the mapped system call is in the second configuration that is executable in the second computer, and wherein the mapped system call provides a service equivalent to the service provided by the system call of the first computer; and the first kernel transforming parameters of the system call of the first computer into corresponding parameters in the second configuration for the mapped system call such that the second computer executes the mapped system call on behalf of the first computer by use of the corresponding parameters in the second configuration to provide the requested service to the user application running on the first kernel.

10. The computer program product of claim 7, the method further comprising:

the second kernel receiving the converted system call from the first kernel;

the second kernel determining that the received converted system call has no parameter that refers to a first memory space in the first computer;

the second kernel executing the received converted system call on the second computer by use of parameters received from the first kernel; and the second kernel sending the result of said executing to the first computer system, wherein, said receiving of the converted system call, said determining, said executing, and said sending of the result are performed by the second kernel after the transferring and before the obtaining.

11. The computer program product of claim 7, the method further comprising:

the second kernel receiving the converted system call from the first kernel;

the second kernel determining that at least one parameter necessary to execute the received converted system call is a memory reference parameter that refers to a first memory space in the first computer;

the second kernel finding a corresponding memory parameter that corresponds to the memory reference parameter, wherein the corresponding memory parameter refers to a second memory space in the second computer;

the second kernel executing the received converted system call on the second computer, wherein said executing comprises a function of the corresponding memory parameter; and the second kernel sending the result from said executing to the first computer, wherein, said receiving of the converted system call, said determining, said finding, said executing, and said sending of the result are performed by the second kernel after the transferring and before the obtaining.

12. The computer program product of claim 7, wherein the first computer is a lower-end server that is configured to primarily execute the user application within the hybrid system, wherein execution of the user application creates a computation-intensive workload, and wherein the second computer is a higher-end mainframe that is configured to provide kernel services for the hybrid system.

13. A system comprising a processor and a computer readable memory unit coupled to the processor, said memory unit containing instructions that when executed by the processor implement a method for handling a system call in a hybrid system, the method comprising:

a method for handling a system call in a hybrid system, wherein the hybrid system comprises a first computer and a plurality of remote computers, wherein the plurality of remote computers comprises a second computer, wherein the architecture of the first computer differs from the architecture of the second computer, wherein the operating system of the first computer differs from the operating system of the second computer, wherein the first computer is running a first kernel and a user application, wherein the second computer is running a second kernel, and wherein the first kernel is coupled to the second kernel by a kernel-to-kernel data path such that the user application perceives the hybrid system as a single computer system, the method comprising:

the first computer receiving a request from the user application to execute the system call, wherein the system call requests a service required by the user application;

the first computer forwarding the request to the first kernel;

the first kernel associating the system call with a single-digit numeric category, wherein the single-digit numeric category is selected as a function of the type of service requested by the system call;

the first kernel determining that the system call will be serviced by the second computer, wherein the determining is a function of the numeric category, wherein the determining is a further function of an identification by the first kernel that the requested service is not related to memory management, and wherein the determining is a further function of an identification by the first kernel that the second computer can service the first request more efficiently than can an other computer comprised by the hybrid system;

the first kernel converting the system call into a second configuration that is compatible with the second computer such that the second computer is able to service the system call, wherein the second configuration is a function of second characteristics of the second computer, wherein the second characteristics are selected from the group comprising endianness, address space usage, pointer usage, namespace for object identifiers, and memory object synchronization rules;

the first kernel transferring the converted system call to the second kernel via the kernel- to-kernel data path;

the first kernel obtaining, from the second kernel via the kernel-to-kernel data path, a result of servicing the converted system call, wherein the result is produced by the second kernel;

the first kernel adjusting the obtained result into a first configuration, wherein the adjusted result is compatible with the user application, wherein the adjusted result appears to the user application to have been performed by the first computer, wherein the first configuration is a function of first characteristics of the first computer, and wherein the first characteristics are selected from the group comprising endianness, address space usage, pointer usage, namespace for object identifiers, and memory object synchronization rules; and the first kernel providing to the user application the service requested by the system call by sending the adjusted result to the user application.

14. The system of claim 13, said discovering comprising:

finding that the system call is comprised by a set of at least one non-local system calls of the first computer that is executable on the second computer, wherein said at least one non-local system calls is not required to be locally executed by the first kernel, wherein said at least one non-local system calls is selected from the group comprising: time service system calls, process management system calls, signal management system calls, scheduling system calls, file management system calls, file system management system calls, network system calls, input/output (I/O) system calls, inter-process communication (IPC) system calls, debugging system calls, logging system calls, and shared memory management system calls, and wherein each non-local system call of said at least one non-local system calls of the first computer corresponds to a respective system call of the second computer such that said each non-local system calls of the first computer and the respective system call of the second computer provide a same kernel service upon being executed.

15. The system of claim 13, said converting comprising:

the first kernel finding a mapped system call in the second configuration that corresponds to the system call of the first computer, wherein the system call of the first computer is in the first configuration that is executable in the first computer and the mapped system call is in the second configuration that is executable in the second computer, and wherein the mapped system call provides a service equivalent to the service provided by the system call of the first computer; and the first kernel transforming parameters of the system call of the first computer into corresponding parameters in the second configuration for the mapped system call such that the second computer executes the mapped system call on behalf of the first computer by use of the corresponding parameters in the second configuration to provide the requested service to the user application running on the first kernel.

16. The system of claim 13, the method further comprising:

the second kernel receiving the converted system call from the first kernel;

the second kernel determining that the received converted system call has no parameter that refers to a first memory space in the first computer;

the second kernel executing the received converted system call on the second computer by use of parameters received from the first kernel; and the second kernel sending the result of said executing to the first computer system, wherein, said receiving of the converted system call, said determining, said executing, and said sending of the result are performed by the second kernel after the transferring and before the obtaining.

17. The system of claim 13, the method further comprising:

the second kernel receiving the converted system call from the first kernel;

the second kernel determining that at least one parameter necessary to execute the received converted system call is a memory reference parameter that refers to a first memory space in the first computer;

the second kernel finding a corresponding memory parameter that corresponds to the memory reference parameter, wherein the corresponding memory parameter refers to a second memory space in the second computer;

the second kernel executing the received converted system call on the second computer, wherein said executing comprises a function of the corresponding memory parameter; and the second kernel sending the result from said executing to the first computer, wherein, said receiving of the converted system call, said determining, said finding, said executing, and said sending of the result are performed by the second kernel after the transferring and before the obtaining.

* * * * *